Oct. 23, 1934.    J. J. DILKS, JR    1,978,250
MOTION PICTURE PROJECTION METHOD AND APPARATUS
Filed Sept. 18, 1930    6 Sheets-Sheet 4
FIG. IV.
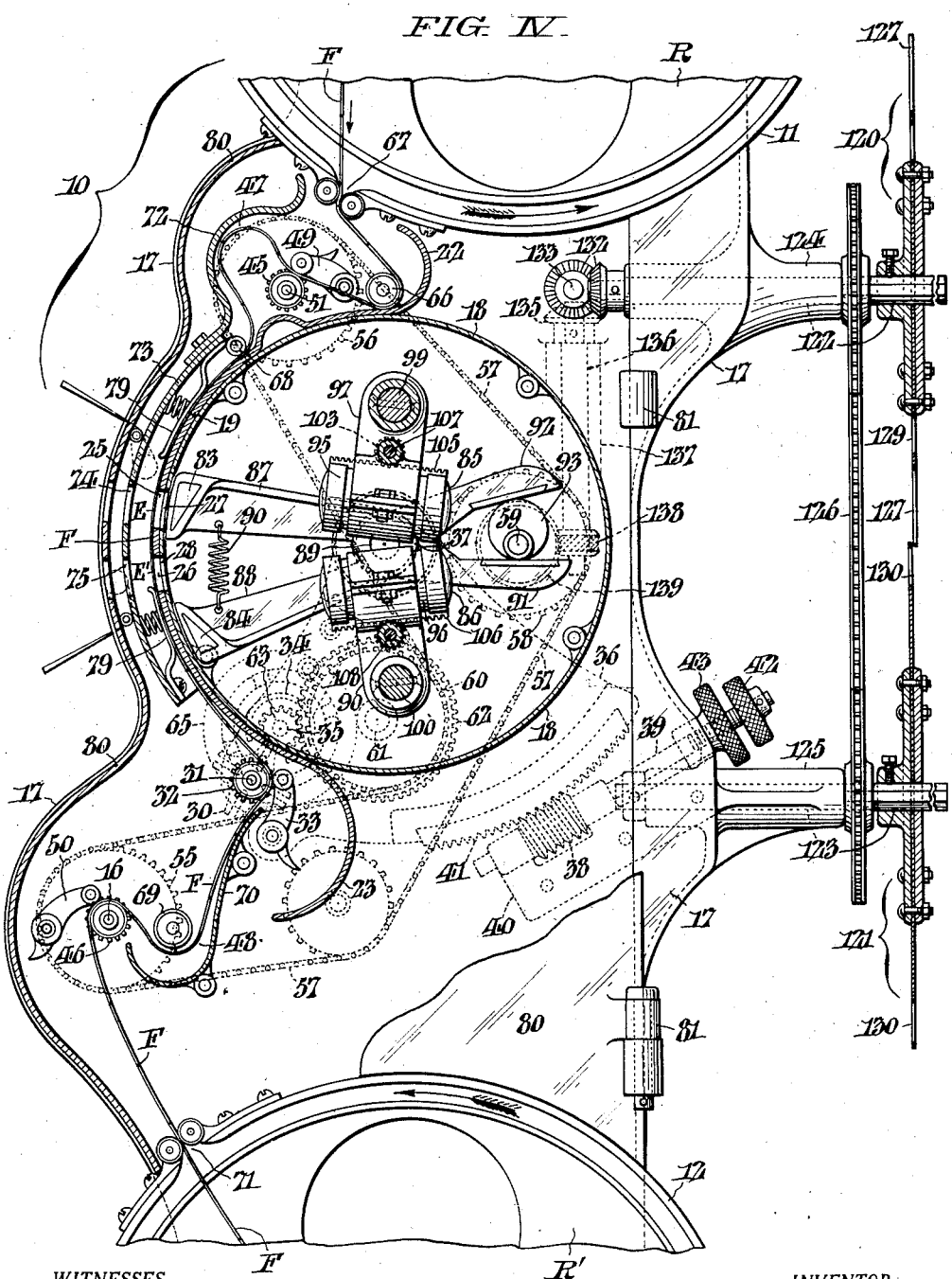
WITNESSES
John C. Bergner
Hubert Fuchs
INVENTOR:
James J. Dilks, Jr.,
BY Frailey Paul
ATTORNEYS.

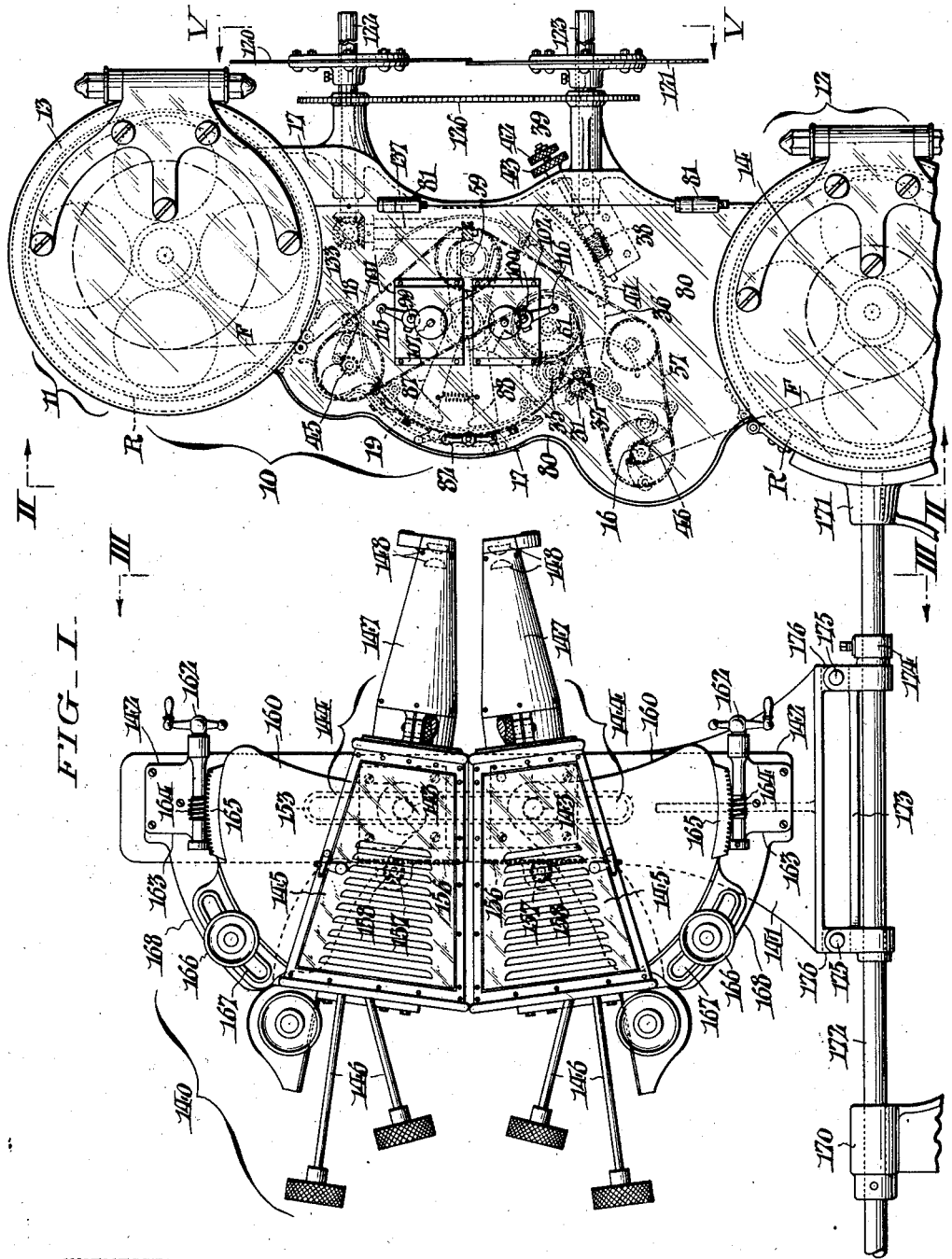

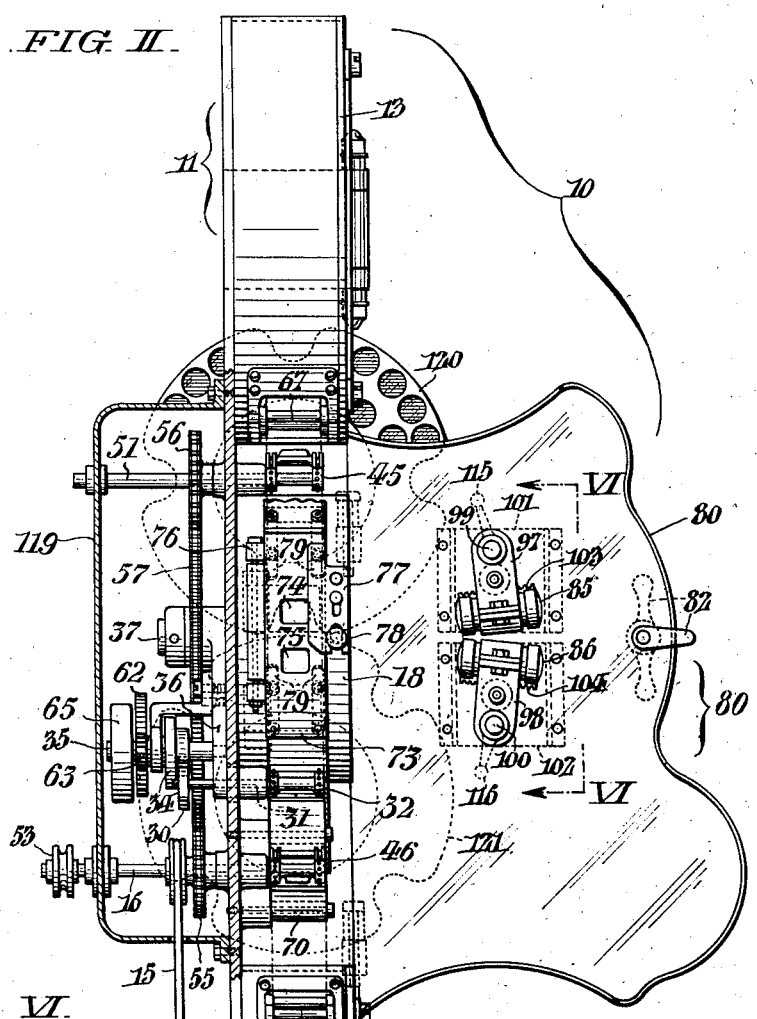

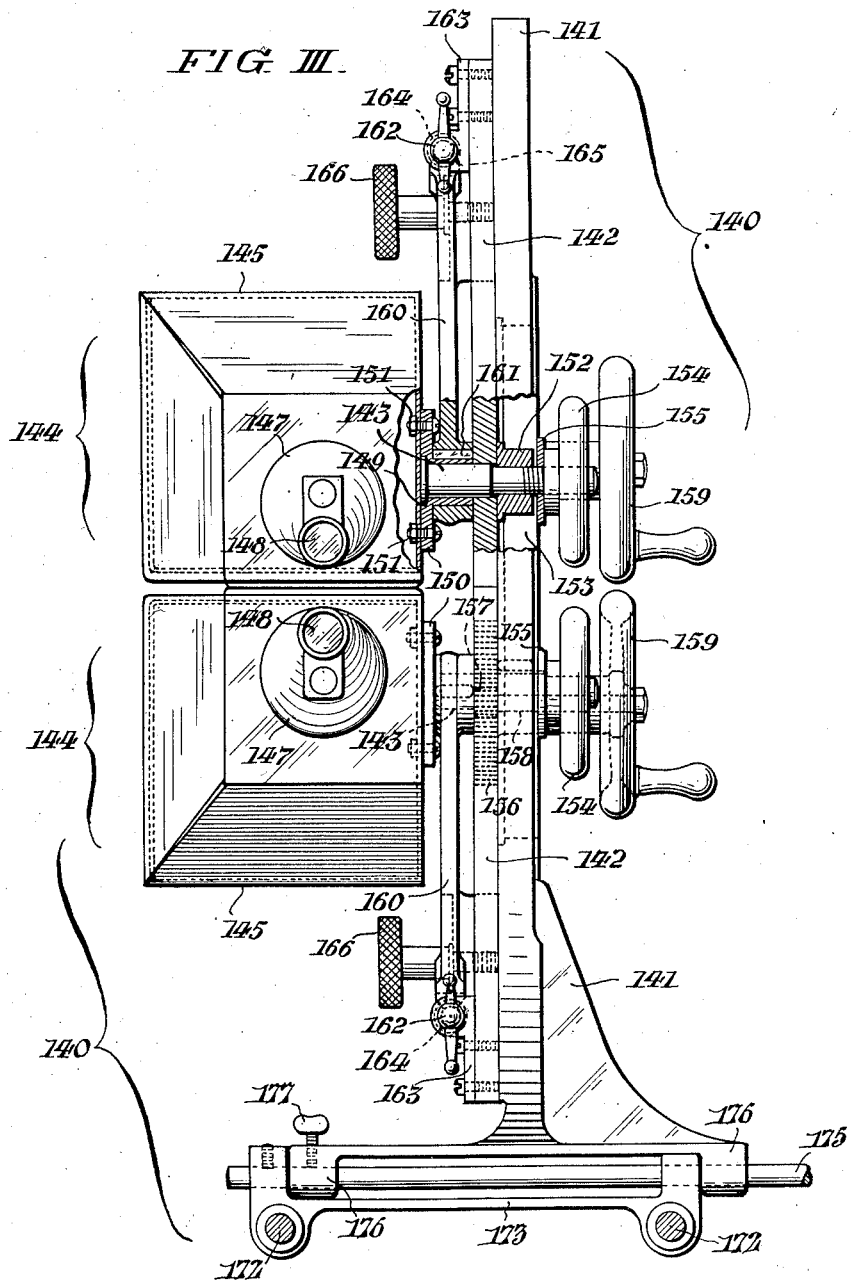

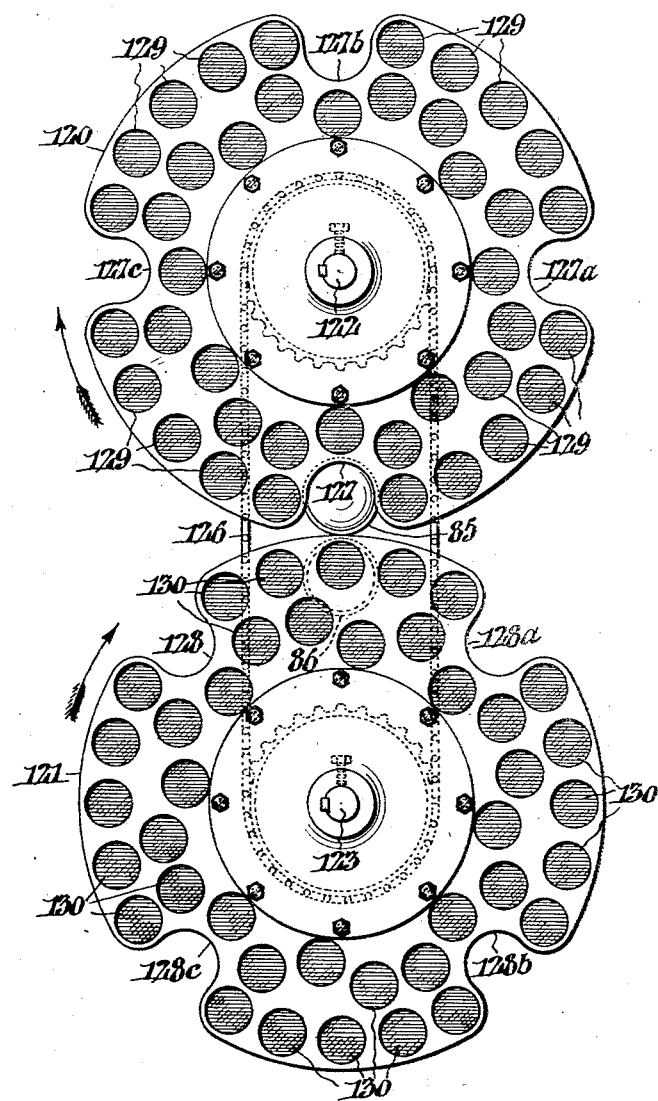

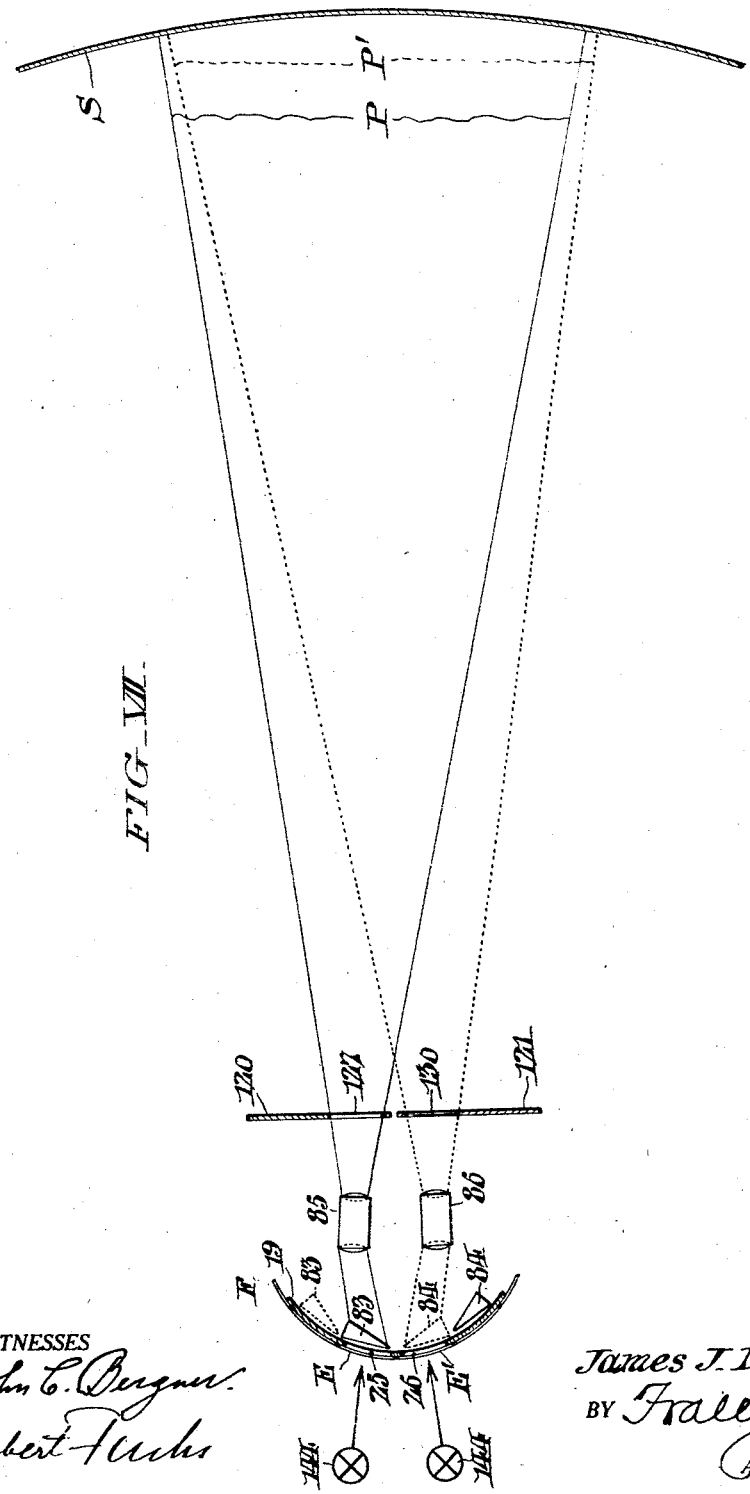

Patented Oct. 23, 1934

1,978,250

UNITED STATES PATENT OFFICE 1,978,250

MOTION PICTURE PROJECTION METHOD AND APPARATUS

James J. Dilks, Jr., Philadelphia, Pa.

Application September 18, 1930, Serial No. 482,661

16 Claims. (Cl. 88—16.6)

This invention relates to methods of projecting motion pictures, as well as to motion picture projecting apparatus.

The chief aim of my invention is to create, through illusion, the effect of greater depth or perspective than possible of attainment under prevalent methods of projection with standard single strip films such as are ordinarily used. This desideratum I secure, as hereinafter fully explained, by projecting each individual picture of the film twice in succession in slightly offset relation onto the screen, and causing the two exposures of the individual pictures to blend into each other and into adjacent pictures of the film through color, preferably blue or purple, so that the shadows in the pictures are rendered more realistic with attendant heightening of the effect of perspective obtained by illusion.

Another object of my invention is to provide a simple form of projecting apparatus with suitable instrumentalities operating in coordination with the movements of the film to bring about the illusion essential to my new method of projection as above briefly set forth.

Still further objects and attendant advantages of this invention will be manifest from the detialed description following in connection with the attached drawings, whereof Fig. I is a view of my improved motion picture apparatus showing its projector and associated illuminating means in side elevation.

Fig. II is an elevation of the rear end of the projector, i. e. an elevation viewed in the direction of the arrows II—II in Fig. I, with portions broken away and in section to better show parts at the interior, and with its side door swung open.

Fig. III is an elevation of the front end of the illuminating means viewed in the direction of the arrows III—III in Fig. I.

Fig. IV is a fragmentary vertical sectional view through the central plane of the projector drawn to a larger scale.

Fig. V is a view taken as indicated by the arrows V—V in Fig. I showing a pair of rotary illusions and cut-off discs associated with the projector.

Fig. VI is a detail sectional view taken as indicated by the arrows VI—VI in Fig. II featuring a lens adjusting means of the projector; and Fig. VII is a diagram illustrating the principle of motion picture projection in accordance with my invention.

The apparatus which I provide for carrying out my new method of motion picture projection comprises, as shown in Fig. I of these illustrations, a projector comprehensively designated by the numeral 10, and an associated illuminating means indicated by the numeral 140. Incident to projection, the film shown at F is drawn from a reel R in the upper magazine 11 of a projector, and collected on a reel R' in the lower magazine 12 of the projector, said magazines being accessible respectively through closures 13 and 14 hinged to the vertical frame 17 of the projector. As shown in Fig. II, the lower reel R' in the magazine 12 is driven by a belt 15 from the main or drive shaft 16 of the projector, which shaft is journalled in a bearing afforded by the frame 17. Fixed on the frame 17 intermediate the magazines 11, 12 as best shown in Figs. II and IV, is a drum-like housing 18, to the periphery of which is in turn secured an arcuate aperture plate 19 which is overtravelled by the film F. This aperture plate 19 is substantially semi-circular and has reversely curved ends 22, 23 for a purpose later on explained, and provided with symmetrically displaced exposure openings 25, 26 above and below the horizontal central plane through its center of curvature, which openings coincide with similarly disposed openings 27, 28 in the housing 18. The means relied upon for intermittently progressing the film F has the form of a Geneva movement whereof the star wheel component 30 is secured on a shaft 31 journalled in the frame 17 beneath the housing 18. To the shaft 31 is also secured a toothed propelling wheel 32 that engages the usual marginal apertures of the film F, and against which the film is held by means of a spring urged roller arm 33. The actuating member 34 of the Geneva movement aforesaid is mounted on another shaft 35 which is journalled in a bearing afforded by a sector 36 which is fulcrumed for the purpose of adjustment about a bearing boss 37 on the frame 17 coincident with the center of the housing 18. The means for adjusting the sector to accurately register adjacent exposures E, E' of the film F with the openings 25, 26 in the aperture plate includes a worm 38 which is secured to a shaft 39 rotatable in a bearing bracket 40 bolted to the back of the frame 17, said worm being in mesh with gear teeth 41 on the sector. For the purpose of manual manipulation, the adjusting shaft 39 is fitted with the thumb knob 42 which is accessible at the front of the projector as well as with a jamb nut 43 that insures against accidental displacement of the sector after adjustment. To avoid undue tension on the film and to prevent at the same time interference with the intermittent progression thereof as aforesaid, I provide supplemental toothed wheels 45, 46 for feeding said film with maintenance of a certain amount of slack in it above and below the guide plate as at 47, 48, the film being held in engagement with the wheels by pivoted spring-urged retractable roller arms 49, 50 similar to the roller arm 33 described in connection with the toothed wheel 32. The wheel 45 is respectively secured to the shaft 51, while the wheel 46 is mounted on the main drive shaft 16 previously referred to. As shown in Fig. II, the shaft 16 is fitted at its protruding end with a pulley 53 for application thereto of power from a suitable source not shown. Motion is communicated from a sprocket wheel 55 on the main shaft 16 to a like sprocket wheel 56 on the shaft 51 by a chain 57 so that the toothed wheel 45 is driven in unison with the toothed wheel 46. The chain 57 also communicates motion to a sprocket wheel 58 on a shaft 59 as well as to a sprocket wheel 60 on another shaft 61 which latter is journalled in the sector 36 previously referred to. The shaft 61 also carries a gear wheel 62 to drive an intermeshing pinion 63 fast on the shaft 35 with the actuating member 34 of the Geneva movement. A fly wheel 65 on the shaft 35 serves as a means to promote smoothness in the operation of the Geneva movement and attendant regularity in the intermittent progression of the film F. In the interval between the magazines 11, 12, the film F is confined to a definite course by means supplemental to the aperture plate 19 and the toothed wheels 32, 45 and 46 already described. This supplemental means includes a roller 66 which receives the film F immediately upon issuing from the egress slot 67 in the casing of the upper reel magazine 11, and re-directs said film to the toothed wheel 45. Another roller 68 co-operates with the roller of the keeper arm 49 and the toothed wheel 45 to confine the slack 47 in the film to easy curves thereby precluding injury to the film. Still another roller 69 located adjacent the toothed wheel 46 serves by cooperation with an adjacently located curved guard secured to the frame 17 to confine the slack at 48 likewise to easy curves. After passing around the toothed wheel 46, the film enters the lower magazine 12 by way of a slot 71 in the casing of the latter. A guard 72 similar to the guard 70 just described, serves in a like manner to confine the upper slack in the film at 47 above the housing 18. This guard 72 is secured to the top end of a cover piece 73 which is curved concentrically in relation to the aperture plate 19 and provided with light openings 74, 75 in line with the exposure openings 25, 26 in said plate. In order that it may be swung out of the way to facilitate initial threading of the film in the projector, the cover piece 73 is hinged to the frame 17 along one of its vertical edges as shown at 76 in Fig. II. Normally the cover piece 73 is locked in place by a slide latch 77 that engages a stud 78 on the casing 18 also as shown in Fig. II. By reference to Fig. IV, it will be seen that the cover piece 73 carries spring-influenced fingers 79 for pressing the film against the aperture plate 19. All the parts hereinbefore described as being positioned between the upper and lower film reel magazines 11, 12 are protected in an enclosure jointly formed by the frame 17 and an edge flange of the side door 80 which is hinged along one edge to the said frame at 81, 81, and provided with a keeper latch 82 to lock it in closed position. In this connection, it will be observed that the curved ends 22, 23 of the aperture plate 19 constitute with the guards 72 and 48 chambers for confining the film in the event of breakage or rupture of the latter thereby to avoid entanglement.

The optical equipment of the projector includes a pair of prismatic lenses 83, 84 adapted to be moved alternately in position in front of the exposure openings 25, 26 in the aperture plate 19 as well as a pair of projecting lenses 85, 86 for cooperation with said prismatic lenses. The prismatic lenses 83, 84 are secured respectively to the ends of levers 87, 88 fulcrumed to oscillate independently on a stud 89 let into the bearing boss 37 at the center of the housing 18, and connected by a spring 90 whereby their tails 91, 92 are maintained in engagement with an eccentric actuating cam 93 mounted on the shaft 59 of the sprocket wheel 58 previously referred to. As shown in Fig. II, the projecting lenses 85, 86 are carried by the side door 80 of the projector. These lenses are of the duplex variety and mounted respectively in barrels 95, 96 which are adjustable longitudinally in the ends of arms 97, 98 fixed to shafts 99, 100 having journal support in plates 101, 102 secured to the outside face of the door 80. As a convenient means for adjusting the lens barrels 95, 96 in the arms 97, 98, I provide pinions 103, 104, (Fig. VI) to actuate racks 105, 106 on the barrels, the shafts 107, 108 of the pinions being rotatable in elongated bosses 109, 110 of the arms 97, 98 which extend through arcuate slots in the door. At their outer ends the shafts 107, 108 are fitted with manipulating knobs 111, 112 and also with jamb nuts 113, 114 for fixing the adjustments. The arms 97, 98 are in turn adjustable angularly by means of manipulating levers 115, 116 secured to the outer ends of their shafts 99, 100 and fixable by set screws 117, 118 taking into bosses of the plates 101, 102 and binding against said shafts.

The various parts thus far described of the drive mechanism of the projector 10 are all enclosed in a protective casing 119 secured to the back of the frame 17, see Fig. II, and the ratios are such that the prismatic lens 83 is retracted from in front of the opening 25 of the aperture plate concurrently with shifting of the picture E of the film F down to the aperture 26 and presentation of the prismatic lens 84 in front of the latter aperture and vice versa.

To co-operate with the prismatic lenses 83, 84 incident to cutting in and out by the latter of the pictures of the film F, I provide at the front of the projector 10, a pair of revolving illusion disks 120, 121 which are keyed with capacity for endwise positional adjustment on separate shafts 122, 123 having journal support in bearings 124, 125 of the frame 17, and which are rotated in unison through a sprocket chain 126. As shown, the disks 120, 121 have four equi-spaced notches 127, 127a, 127b, 127c and 128, 128a, 128b, 128c, respectively, which, as they sweep across the front of the lenses 85, 86 permit clear (black and white) momentary projection of the pictures. It is to be particularly noted here that the disks 120, 121 are angularly positioned on the shafts 122, 123, so that their peripheral notches are alternatingly brought into registry with the lens 85, 86, respectively. Through suitable drive connections to be presently described, the movement of the illusion disks is co-ordinated with the movement of the prismatic lenses 83, 84, such that when the lens 83 is in position to receive the picture at the opening 25 in the aperture plate 19, a notch of the upper disk 120 is in registry with the projecting lens 85; and when the prismatic lens 84 is in position to receive the picture shifted to the opening 26 of the aperture plate 19, the following notch of the lower disk 121 is brought into registry with the projecting lens 86. In addition to the peripheral notches, the disks 120, 121 are respectively provided in the circumferential intervals between said notches, with numerous small circular windows 129, 130 of blue or purple celluloid or the like, these being so distributed as to determine graduated blending of successive exposure of the individual pictures of the film one into the other and into adjacent pictures. Through color concurrently with shiftings of the film pictures from the opening 25 of the aperture plate 19 to the opening 26 and with the co-ordinated movements of the prismatic lenses 83, 84. Coming now to the drive connections for the illusion disks, it will be observed from Fig. IV that they include a bevel gear couple 132 by which motion is transmitted to the shaft 122 of the upper disk 120 from a transverse shaft 133 journalled in the frame 17. The shaft 133 is in turn driven through bevel gearing at 135 from a vertical shaft 136 which rotates in a bearing 137 at the back of the frame 17 and carries at its bottom end a spiral gear 138 in mesh with a companion spiral gear 139 on the shaft 59 of the eccentric 93.

Referring now to Figs. I and III, the illuminating means 140 comprises an upright frame 141 which affords guidance to a pair of independently vertically adjustable slides 142. Mounted with capacity for angular adjustment about fulcrum pins 143 respectively engages in the slides 142, are lighting units 144 with housings 145 enclosing electric arc lamps, not shown, whereof the controls are indicated at 146 in Fig. I. Secured in the tapered tube extensions 147 forwardly of the housings 145 of the units 144 are condensing lenses 148 which are adapted to direct concentrated light shafts respectively into the apertures 74, 75 in the cover plate 73 of the projector 10. In each case, the headed end of the fulcrum pin 143 is lodged in a recess 149 of a trunnion piece 150 secured to the housing by screws 151. The diametrically reduced end of the fulcrum pin 143 projects through a bearing block 152 having guidance in a vertical slot 153 of the upright frame 141. Beyond the block 152 the reduced end of the fulcrum pin 143 is threaded and engaged by a nut in the form of a hand wheel 154 which is operative upon a clamp plate 155 bridging the slot 153 on the side of the frame opposite to that occupied by the slide 142 in clamping the unit 144 against movement in adjusted positions. To facilitate vertical adjustment of each housing 144, the corresponding supporting slide 142 is provided along one edge with rack teeth 156 to mesh with a pinion 157 on one end of a shaft 158 rotatable in a side lug of the frame 141, said shaft being operable by means of a hand wheel 159 secured to its opposite end, see Fig. III. The means whereby each lighting unit 145 is adjustably angularly includes a sector 160 which is secured to the trunnion member 150 by a key 161. An adjusting shaft 162 with bearing support in a bracket 163 secured to the corresponding slide 142 carries a worm 164 that meshes with rack teeth 165 on the sector 160. A clamp screw 166 passing through a concentric slot 167 of the sector 160 and engaging a lateral wing projection 168 of the slide serves to hold the parts fixed after adjustment. As a consequence of the described construction, the light units 144 may be adjusted both up and down as well as angularly in the plane of the apertures 74, 75 in the cover piece 73 of the projector 10, so that the shafts of condensed light emitted through the condensing lens 148 may be directed accurately into the aforesaid apertures.

The projector 10 is supported by a suitable floor stand whereof portions are shown at 170, 171, in Fig. I, between which extend a pair of parallel horizontal guide rods 172 for a carriage 173 whereon is mounted the illuminating means 140. The illuminating means may thus be backed away from the projector 10 to enable more ready access to the latter ordinarily as well as to safeguard against fire in case the film should get stuck in the projector, the proper operative position of the illuminating means 140 being determined by stop collars 174 secured to the guide rods 172. The carriage 173 in turn provides a pair of transversely extending guide rods 175 which are engaged by bosses 176 at the bottom of the frame 141 so that the lighting means 140 can be moved transversely of the projector 10 if required, displacement of the frame 141 on the rods 175 being ordinarily prevented by a set screw 177 engaged in one of the bosses 176.

In order to avoid distortion of the pictures which would otherwise result from confinement of the film F to curvilinear travel incident to passage over the aperture plate 19, I employ a countercurved or concave screen such as shown at S in the diagram of Fig. VII.

The operation of the apparatus is as follows: To begin with, the units 144 of the illuminating means 140 are adjusted to direct their light shafts through the aligned openings 74, 25 and 75, 26 respectively of the cover piece 73 and the aperture plate 19 of the projector 10; the sector 36 properly regulated to predetermine exact registry of adjacent pictures E, E' of the film F with the contiguous exposure openings in the aperture plate 19; and the projecting lens 85, 86 angularly adjusted to respectively receive the images of the pictures from the prismatic lenses 83, 84 and to project the said images onto the concaved screen S of Fig. VII in slightly offset relation as indicated at P, P'. Incident to intermittent progression of the film F by the Geneva movement 30, 31 each picture thereof is presented first at the opening 25 of the aperture plate 19 and then again at the aperture 26 as hereinbefore explained. With the prismatic lens 83 in position before the opening 25 in the aperture plate 19 as shown in full lines in Figs. IV and VII the image of the picture E of the film F is dirceted to the corresponding projecting lens 85, and, by the latter, projected clear (black and white) onto the screen S through the notch 127 of the upper illusion disk 120 which notch is then in the position of Fig. V in front of the lens 85. At the same instant, the other prismatic lens 84 is in retracted position relative to the opening 26 of the aperture plate 19 also as shown in full lines in Figs. IV and VII, while the lens 86 is covered by one of the blue windows 130 of the illusion disk 121 so that the picture E' of the film F at the opening 26 is not projected. With ensuing retraction of the prismatic lens 83 from in front of the opening 25 to the dotted line position shown in Fig. VII and attendant eclipsing of the lens 85 by the blue windows of the disk 120 immediately adjacent the notch 127 through concurrent movement of said disk, the picture E of the film is shifted from the opening 25 of the aperture plate 19 down to the opening 26. During the same interval the prismatic lens 84 is moved into the raised dotted position of Fig. VII in front of the aperture plate opening 26, and the notch 128 of the illusion disk 121 advanced into registry with the lens 86. The picture E of the film is thus again projected onto the screen S in black and white, but this time in slightly offset relation in respect to the first projection thereof. The events just described constitute a cycle in the operation of the apparatus, which cycle is repeated for each picture of the film. It is of course to be understood that, in practice, the apparatus is driven at such speed that the recited changes occur so rapidly as to create, through successive projections of the individual film pictures onto the screen in offset superimposition, the illusion of greater depth or perspective than actually exists in the pictures. The effect of the perspective so obtained is heightened and the shadows emphasized by blending of the exposures of the individual pictures into one another and into adjacent pictures through color as a consequence of co-operation as between the prismatic lenses 83, 84 under the influence of the smooth acting eccentric cam 93, and the rotary illusion disks 120, 121. In addition to blending of the pictures one into another as just explained, the pictures are individually exposed for an instant through the color of the windows 129 and 130 of the rotating disks 120, 121 immediately following the notches 127, 128 before shifting of the prismatic lenses 83, 84, the projecting lenses 85, 86 being at no time totally obscured. This action will be readily understood by reference to Figs. IV and V of the drawings. In actual practice with my apparatus, the pictures appear clear except for the coloring of the shadows.

Having thus described my invention, I claim:—

1. In a motion picture projector, an aperture plate with an opening for exposure of the individual pictures of the film, a projecting lens, an interposed prismatic lens to direct the image of the exposed picture to the projecting lens, means for moving said prismatic lens out of and back into operative relation with the projecting lens during alternate shifts of the film thereby to cause blending of one picture into another, and a rotary disc having peripheral notches in alternation with color windows adapted to sweep across the front of the projecting lens, said disc being so timed with the shifting of the film and the movements of the prismatic lens that each picture is shown clear but blended into the next through the color of the disc windows.

2. In a motion picture projector, an aperture plate with two contiguously allocated openings for successive exposures of each picture of the film, separate lenses for projecting the individual picture presented successively at the openings of said plate onto a screen in slightly offset relation, and means determining momentary clear projection of the pictures through the lenses and mergence of one exposure of the picture into the other through color incident to shifting of the film.

3. In a motion picture projector, an arcuate aperture plate with two contiguously allocated radial openings for successive exposures of each picture of the film, separate angularly positioned lenses for projecting the individual picture successively upon presentation at the openings of said aperture plate, and a pair of prismatic lenses swingable about the center of curvature of the aperture plate for directing the images of the successive exposures to the respective projecting lenses.

4. In a motion picture projector, an aperture plate with two contiguously allocated openings for successive exposures of each picture of the film, a separate lens for projecting the successive exposures of the picture in offset relation onto a screen, and a pair of prismatic lenses with means for shifting them alternately into and out of position before the openings in the aperture plate, thereby to direct the successive images of the picture respectively to the projecting lens aforesaid.

5. In a motion picture projector, an aperture plate with two contiguously allocated openings for successive exposures of individual pictures of the film, a pair of coordinated lenses for projecting the successive exposures of the individual picture onto a screen in slightly offset relation, a pair of interposed prismatic lenses with means for moving them into and out of position alternately before the openings in the aperture plate, thereby to direct the successive images of the picture respectively to the projecting lenses, and a pair of rotary discs having edge notches in alternation with color windows adapted to sweep across the projecting lenses, said discs being timed with the shifting of the film and the movement of the prismatic lenses so as to determine momentary clear projection of each exposure with mergence of one exposure into the other through color of the window openings.

6. In motion picture apparatus, a projector comprising an arcuate aperture plate with two contiguously allocated radial openings for successive exposures of each picture of the film, separate lenses for projecting the individual picture presented successively at the openings of said aperture plate incident to intermittent progression of the film onto a screen in slightly offset relation, a pair of interposed prismatic lenses with means for shifting them alternately into and out of position before the openings in the aperture plate, thereby to direct the successive images of the picture respectively to the projecting lenses aforesaid, and means timed with the shiftings of the film and with the movement of the prismatic lenses to cause blending of one exposure of the individual pictures into the other through color; in combination with an associated illuminating means embodying separate angularly adjustable units to respectively direct light into the openings of the aperture plate aforesaid.

7. The method of motion picture projection which comprises projecting, upon a screen, each picture of an ordinary black and white film twice in succession, first in slightly offset relation with the picture immediately preceding it, and then in slightly offset relation with the picture immediately following it; and blending the successive projections one into the other through blue color incident to shifting of the film, thereby to create the illusion of depth or perspective with emphasis upon the shadows.

8. In motion picture projection apparatus, means to progress an ordinary ribbon film before a lens; means cooperating with the lens to determine projection of adjacent pictures of the film in definitely offset relation to create the illusion of depth or perspective; and concurrently operative means determining projection of each picture clear and through color in alternation during the period of its projection for emphasis of the shadows.

9. In motion picture projecting apparatus, an aperture plate with contiguous openings; means to progress an ordinary ribbon film for simultaneous exposure of contiguous pictures through the openings of the aperture plate, a lens movable into line with each opening of said aperture plate for projecting the successive pairs of pictures in slightly offset relation to create the illusion of depth or perspective; and concurrently operative means determining projection of the pictures clear and through color in alternation during the period of their projection for emphasis of the shadows.

10. In motion picture projecting apparatus, an aperture plate with contiguous openings for simultaneous exposure of contiguous pictures of an ordinary ribbon film; means for intermittently progressing the film to the extent of a picture at a time; a lens movable into line with each opening of the aperture plate for projection of the contiguous pictures in slightly offset relation to create the illusion of depth or perspective; and concurrently operative means determining projection of the pictures clear and through color in alternation during the period of their projection for emphasis of the shadows.

11. In motion picture projecting apparatus, an aperture plate with contiguous openings; means to progress an ordinary ribbon film for simultaneous exposure of contiguous pictures at the openings of the aperture plate; a lens movable into line with each aperture of the plate to determine projection of the contiguous pictures in slightly offset relation and thereby create the illusion of depth or perspective; and concurrently operative means determining such projection of the superposed pictures clear and through blue color in alternation during the period of their projection for emphasis of the shadows.

12. In a motion picture projector, an aperture plate with contiguous openings; means to progress an ordinary ribbon film; for simultaneous exposure of contiguous pictures at the openings of the aperture plate; a lens movable into line with each opening of the aperture plate for projection of the contiguous pictures in slightly offset relation to create the illusion of depth or perspective; and a concurrently operative rotary disk with peripheral notches and intervening color windows adapted to cut across the line of projection of each lens, thereby to determine projection of the pictures clear and through color in alternation during the period of their projection for emphasis of the shadows.

13. The method of motion picture projection which comprises projecting each picture of an ordinary ribbon film twice in succession, first in offset relation with the picture preceding it and then in offset relation with the picture following it to create the illusion of depth or perspective, and at the same time projecting each picture both clear and through color in alternation during the period of its projection as aforesaid, thereby to emphasize the shadows.

14. In motion picture projecting apparatus, means to progress an ordinary ribbon film past a lens; means cooperating with the lens to determine projection of adjacent pictures of the film in definite offset relation to create the illusion of depth or perspective; and a concurrently operative rotary disk with peripheral notches and intervening color windows to cut the line of projection so that each individual picture of the film is projected clear and through color in alternation during the period of its projection for emphasis of the shadows.

15. In motion picture projecting apparatus, means for projecting each picture of an ordinary ribbon film twice in succession, first in offset relation with the picture preceding it, and then in offset relation with the picture following it, to create the illusion of depth or perspective; and concurrently operative means determining projection of each picture clear and through color in alternation during the period of its projection for emphasis of the shadows.

16. The method of motion picture projection which comprises projection of contiguous pictures of an ordinary ribbon film in definite offset relation to create the illusion of depth or perspective, and at the same time projecting each picture both clear and through color, in alternation, during the period of its projection as aforesaid, thereby to emphasize the shadows.

JAMES J. DILKS, Jr.